(12) United States Patent
Forejt et al.

(10) Patent No.: US 11,893,834 B2
(45) Date of Patent: Feb. 6, 2024

(54) SUPPLY AIR CONTAMINATION DETECTION

(71) Applicant: Honeywell International Inc., Charlotte, NC (US)

(72) Inventors: Lubos Forejt, Roztoky (CZ); Ralf von Frieling, Stelle (DE); Ian Kerr, Broadway (GB); Jan Ludvik, Jesenice (CZ)

(73) Assignee: Honeywell International Inc., Charlotte, NC (US)

( * ) Notice: Subject to any disclaimer, the term of this patent is extended or adjusted under 35 U.S.C. 154(b) by 195 days.

(21) Appl. No.: 17/394,124

(22) Filed: Aug. 4, 2021

(65) Prior Publication Data
US 2022/0237954 A1 Jul. 28, 2022

Related U.S. Application Data

(60) Provisional application No. 63/170,039, filed on Apr. 2, 2021, provisional application No. 63/142,386, filed on Jan. 27, 2021.

(51) Int. Cl.
G07C 5/00 (2006.01)
G07C 5/08 (2006.01)
G08B 21/12 (2006.01)

(52) U.S. Cl.
CPC ............. *G07C 5/006* (2013.01); *G07C 5/085* (2013.01); *G07C 5/0816* (2013.01); *G08B 21/12* (2013.01)

(58) Field of Classification Search
CPC ...... G07C 5/006; G07C 5/0816; G07C 5/085; B64D 13/00; B64D 2045/0085; B64F 5/60; G08B 21/12
See application file for complete search history.

(56) References Cited

U.S. PATENT DOCUMENTS

| 5,742,516 A * | 4/1998 | Olcerst | F24F 11/0001 436/138 |
| 5,750,999 A * | 5/1998 | Fox | G01N 33/0013 436/155 |
| 5,791,982 A * | 8/1998 | Curry | B64D 13/06 454/76 |
| 6,449,963 B1 * | 9/2002 | Ng | B64D 13/06 454/71 |

(Continued)

FOREIGN PATENT DOCUMENTS

| EP | 3296207 A1 | 3/2018 |
| WO | 2019227237 A1 | 12/2019 |

OTHER PUBLICATIONS

Extended Search Report from counterpart European Application No. 21210612.4 dated May 12, 2022, 13 pp.

(Continued)

*Primary Examiner* — Mussa A Shaawat
(74) *Attorney, Agent, or Firm* — Shumaker & Sieffert, P.A.

(57) ABSTRACT

In some examples, a data processing system can be configured to mount on a vehicle and configured to receive sensor data from a sensor on the vehicle, wherein the sensor data indicates a contamination level of a supply air for the vehicle; receive context data from another system on the vehicle; and generate a recommended maintenance item to be performed on the vehicle based on the sensor data and further based on the context data.

20 Claims, 5 Drawing Sheets

(56) References Cited

U.S. PATENT DOCUMENTS

| | | | | |
|---|---|---|---|---|
| 6,503,462 | B1* | 1/2003 | Michalakos | F24F 3/16 422/198 |
| 6,711,470 | B1* | 3/2004 | Hartenstein | F24F 11/74 700/266 |
| 7,857,892 | B2* | 12/2010 | Marra | B03C 3/08 96/96 |
| 8,092,285 | B2* | 1/2012 | Mathur | B60H 1/00764 454/75 |
| 8,206,475 | B2* | 6/2012 | Walkinshaw | F24F 5/0085 55/385.2 |
| 8,452,489 | B2* | 5/2013 | Marra | B60H 3/0608 73/28.02 |
| 8,560,146 | B2* | 10/2013 | Kwon | G01N 33/0075 701/4 |
| 8,636,003 | B2* | 1/2014 | Deutscher | A62B 7/14 55/357 |
| 8,840,841 | B2* | 9/2014 | Roberts | F24F 8/167 128/205.27 |
| 8,938,973 | B2 | 1/2015 | Dooley et al. | |
| 9,776,725 | B2 | 10/2017 | Fox et al. | |
| 9,884,281 | B2 | 2/2018 | Fox et al. | |
| 9,957,052 | B2 | 5/2018 | Fox et al. | |
| 10,035,609 | B2 | 7/2018 | Ziarno | |
| 10,329,022 | B2 | 6/2019 | Fox et al. | |
| 10,703,488 | B2 | 7/2020 | Fagundes et al. | |
| 11,427,334 | B2* | 8/2022 | Bartosz | B64D 45/00 |
| 11,465,755 | B1* | 10/2022 | Duran | B64D 13/06 |
| 2008/0202332 | A1* | 8/2008 | Rowley | G01N 33/0047 96/108 |
| 2008/0283663 | A1* | 11/2008 | Space | B64D 13/06 244/118.5 |
| 2010/0203818 | A1* | 8/2010 | Gray | B64D 13/04 454/74 |
| 2011/0046822 | A1* | 2/2011 | Gray | B64D 13/04 701/14 |
| 2011/0185302 | A1* | 7/2011 | Kalapodas | G06F 3/0481 715/771 |
| 2012/0117974 | A1* | 5/2012 | Hilgeman | F02C 6/08 60/785 |
| 2012/0253591 | A1* | 10/2012 | Nance | G01M 17/04 701/34.4 |
| 2013/0030718 | A1* | 1/2013 | Williams | G01N 15/0618 702/24 |
| 2013/0231035 | A1* | 9/2013 | Desmarais | B64D 13/006 454/75 |
| 2014/0157872 | A1 | 6/2014 | Welland et al. | |
| 2015/0099444 | A1* | 4/2015 | Le | B64D 13/06 454/76 |
| 2015/0268073 | A1* | 9/2015 | Gaully | G01F 1/34 702/47 |
| 2015/0375187 | A1* | 12/2015 | Yates | B01J 8/008 423/230 |
| 2016/0214723 | A1* | 7/2016 | Fox | B64D 13/06 |
| 2016/0214724 | A1* | 7/2016 | Fox | B64D 13/06 |
| 2018/0118351 | A1* | 5/2018 | Fox | G01N 33/0047 |
| 2018/0148180 | A1* | 5/2018 | Fagundes | B64D 13/00 |
| 2018/0148182 | A1* | 5/2018 | Fagundes | B64D 13/06 |
| 2018/0188166 | A1* | 7/2018 | Zeller | B64F 5/60 |
| 2019/0039739 | A1 | 2/2019 | Winter et al. | |
| 2019/0100318 | A1 | 4/2019 | Space et al. | |
| 2020/0002009 | A1 | 1/2020 | Quartarone et al. | |
| 2020/0009533 | A1 | 1/2020 | Space et al. | |
| 2020/0010201 | A1* | 1/2020 | Karra | G01N 21/7703 |
| 2020/0317368 | A1* | 10/2020 | Bartosz | G01N 33/0032 |
| 2020/0340889 | A1* | 10/2020 | Mlcak | G01N 1/4022 |
| 2020/0340890 | A1* | 10/2020 | Mlcak | G01N 1/2214 |
| 2020/0340949 | A1* | 10/2020 | Mlcak | B64F 5/60 |
| 2020/0340950 | A1* | 10/2020 | Mlcak | G01N 29/222 |
| 2020/0391884 | A1 | 12/2020 | Hawley et al. | |
| 2021/0109008 | A1* | 4/2021 | Waez | G01N 15/1434 |
| 2021/0207833 | A1* | 7/2021 | Dameno | F24F 11/46 |
| 2021/0380259 | A1* | 12/2021 | White | B64D 13/04 |
| 2022/0001999 | A1* | 1/2022 | Pearce | B64D 45/00 |
| 2022/0144455 | A1* | 5/2022 | Doan | B64D 43/00 |

OTHER PUBLICATIONS

Scholz, "Aircraft Design and Systems Group (AERO) Cabin Air Contamination—A Summary of Engineering Arguments Contents", retrieved from https://www.fzt.haw-hamburg.de/pers/scholz/aero//AERO_PRE_GCAQE2019_CAC-SummaryofArguments_19-09-18.pdf, Sep. 18, 2019, 35 pp.

Winder et al., "Aerotoxic Syndrome thesis Cover Sheet", retrieved from https://www.anstageslicht.de/fileadmin/user_upload/Geschichten/Aerotoxisches_Syndrom/Winder-2010_Thesis-AETX-red_opt.pdf, Apr. 29, 2022, 276 pp.

Response to Extended Search Report dated May 12, 2022, from counterpart European Application No. 21210612.4 filed Sep. 27, 2022, 41 pp.

U.S. Appl. No. 16/921,445 naming inventors Pearce et al., filed Jul. 6, 2020.

U.S. Appl. No. 17/171,896 naming inventors Kamire et al. filed Feb. 9, 2021.

Communication pursuant to Article 94(3) EPC from counterpart European Application No. 21210612.4 dated Jul. 25, 2023, 6 pp.

Response to Communication pursuant to Article 94(3) EPC dated Jul. 25, 2023, from counterpart European Application No. 21210612.4 filed Nov. 27, 2023, 12 pages.

* cited by examiner

SUPPLY AIR CONTAMINATION DETECTION

This application claims the benefit of U.S. Provisional Patent Application Ser. No. 63/142,386, filed on Jan. 27, 2021, and U.S. Provisional Patent Application Ser. No. 63/170,039, filed on Apr. 2, 2021, the entire contents being incorporated herein by reference.

GOVERNMENT INTEREST

This matter is under NON-US Government contract UK ATI UKRI Aerospace open Call Germany Luftfahrtforschungsprogramm VI-1.

TECHNICAL FIELD

This disclosure generally relates to systems and methods for monitoring supply air of a vehicle, such as an aircraft.

BACKGROUND

A supply of outside air to a vehicle may become contaminated from artefacts external to the vehicle or from contamination produced by systems internal to the vehicle. For aircraft, example sources of external artefacts that may contaminate an air supply include exhaust ingestion, pollution, deicing fluid, or engine wash products. Example sources of contamination from internal systems include fumes or smoke from engine oil, hydraulic fluid, fuel, or the like. The contamination may be associated with elevated concentrations of gaseous compounds, liquid aerosols, or solid particulates in air. Contaminated air in a vehicle may result in an odor in a cabin that can lead to failures such as trip cancellations or passenger dissatisfaction.

SUMMARY

The present disclosure describes example devices, systems, and methods related to supply air contamination detection. According to one example of this disclosure, a vehicle system includes a plurality of sensors, each implemented in circuitry, configured to be mounted at different locations within a vehicle, and configured to collect sensor data and transmit the sensor data to a processing device. The vehicle system may include processing circuitry configured to generate a recommended maintenance item to be performed on the vehicle based on the sensor data and further based on the context data.

According to one example, a data processing system configured to mount on a vehicle includes communication circuitry configured to: receive sensor data from a sensor on the vehicle, wherein the sensor data indicates a contamination level of a supply air for the vehicle; and receive context data from another system on the vehicle; and processing circuitry configured to generate a recommended maintenance item to be performed on the vehicle based on the sensor data and further based on the context data.

According to another example, a method for detecting contamination on a vehicle includes receiving sensor data from a sensor in the vehicle, wherein the sensor data indicates a contamination level of a supply air for the vehicle; receiving context data from another system on the vehicle; and generating a recommended maintenance item to be performed on the vehicle based on the sensor data and further based on the context data.

According to another example, a device comprising a computer-readable medium having executable instructions stored thereon, configured to be executable by processing circuitry for causing the processing circuitry to: determine a contamination level of a supply air for a vehicle based on sensor data received from a sensor in the vehicle; and generating a recommended maintenance item to be performed on the vehicle based on the contamination level and further based on context data received from another system on the vehicle.

The details of one or more examples are set forth in the accompanying drawings and the description below. Other features, objects, and advantages will be apparent from the description and drawings, and from the claims.

DETAILED DESCRIPTION

Various examples are described below that are generally directed to apparatuses, methods, systems, and computer program products, that relate to a network of sensing devices affixed to locations within a vehicle, such as an aircraft, a road vehicle, or a marine vessel. While aircraft are primarily referred to herein, in other examples, the example apparatuses, methods, systems, and computer program products described herein may be used with other types of vehicles.

The smell(s) in a cabin resulting from external artefacts such as deicing or exhaust fume ingestion are often indistinguishable from the smell(s) arising due to internal system artefacts such as poor auxiliary power unit (APU) maintenance. Thus, the mere presence of a smell in a vehicle cabin is not necessarily a good indicator of whether the vehicle needs maintenance. Moreover, in instances when a vehicle does need maintenance, the presence of a smell in the vehicle does not necessarily provide much guidance as to what maintenance is needed, or even as to where on the vehicle, or within which subsystem of the vehicle, maintenance is needed.

Many existing vehicles are not equipped with permanent, on-board sensors or detection systems that can detect early-stage issues with air contamination or determine which air pathway, e.g., which air supply line has been contaminated. As used in this disclosure, an air supply line may refer to a line, or fluid pathway, that transports bleed air, supply air, or any other type of air to or from the various subsystems within a vehicle. A duct is one example of an air supply line.

In some cases of bleed air contamination, issues, such as seals starting to leak under specific vehicle conditions, may go unnoticed until a severe leak enables contamination at sufficiently high concentrations to reach the cabin and cause odor during flight. Such a situation may force a crew to decide whether to divert, abort take off, or cancel while still taxiing, which happens as frequently as approximately in 40% of such cases, or continue a flight. Even if a crew elects to continue with a flight, the crew may still need to commence maintenance and troubleshooting after the flight. After the flight, a maintenance crew may inspect all bleed air supply lines (e.g., engines, APU, etc.) and examine all possible contaminants but ultimately often identify no fault because the source of odor is not present anymore or at only trace amounts that are below a level of detection or surface contaminated with various liquids and debris cannot be clearly associated with actual odor event.

These smell in cabin (SIC) events can cause relatively large disruptions to vehicle operators and business. This disclosure describes a system that may help diagnose the cause of SIC events relatively early, e.g., before the SIC event is even detectable to humans. Moreover, by understanding the factors that caused, may in the future cause, a particular SIC event, the techniques of this disclosure may allow a vehicle operator to take appropriate action to prevent recurrence and to minimize the time/cost of unnecessary maintenance interventions. For example, this disclosure describes a system that may identify or help isolate the particular subsystem causing contamination.

By integrating sensed data from one or more sensors potentially along with context data, a system of this disclosure may accurately recommend maintenance on a component that may be causing contamination. This recommendation may allow for quicker and more targeted maintenance, less downtime for vehicles, and a lower likelihood that crewmembers or passengers experience any contaminated air. The system may be configured to output the recommended maintenance item to a display, a diagnostic device, and/or an external system.

This disclosure describes techniques that may provide early detection, for various source locations within a vehicle, and if combined with other context data, such as relevant vehicle system data or other data, may also provide targeted guidance to a maintenance crew that leads to preventative maintenance that may eliminate or reduce future SIC events. The context data may include the operational status of the vehicle, the operational status of an engine or motor on the vehicle, a status of an auxiliary power unit, weight-on-wheels data, engine speed data, a status of a bleed valve, a status of a skin valve, a status of another valve, a status of recirculation air, a deicing status, an ambient temperature, and/or an ambient humidity. A system of this disclosure may receive the context data from another system that is onboard the vehicle, such as an engine, APU, or navigation system, or external to the vehicle, such as a weather forecaster or a traffic control system.

The system of this disclosure may include one or more sensors capable of sensing parameter values. Although a wide variety of types of sensors may be used to implement the techniques of this invention, by installing the sensors in strategic locations within the vehicle, the techniques of this disclosure may be implemented using relatively simple sensors. For example, instead of using more complicated sensors that are specifically tuned to sense compounds of a particular substance, such as gasoline or deicing fluid, fine particles, or specific chemical compound, such as one of the fatty acids, the techniques of this disclosure may be implemented using sensors that are configured to generate an output indicative of total volatile organic compound (TVOC) levels. That is, the parameter values obtained by the sensors may be TVOC levels or changes in TVOC levels. In other implementations, however, the one or more sensors may, for example, be configured to detect other specific parameters, e.g., specific types of VOCs and mixtures of such particles and ultrafine particles, representative of bleed air contamination sources, such as carbon monoxide, engine oil, deicing fluid, hydraulic fluid, exhaust fumes, fuel fumes, engine wash products, and the like.

The one or more sensors may be installed within a vehicle at specific locations. For example, multiple bleed air supply lines within the vehicle may have an installed sensor. Examples of such locations include positions downstream of a left engine, downstream of a right engine, downstream of an APU (e.g., upstream of intersection with an engine line), downstream of a left environmental control system (ECS) pack discharge, downstream of right ECS pack discharge, downstream of a low-pressure ground port (LPGP) supply, or downstream of a high-pressure ground port (HPGP) supply. The sensor positions that are downstream of an engine may be upstream of an intersection with another engine line and/or an APU line. In some cases, aircraft that have multiple left engines, multiple right engines, multiple APUs, multiple left ECS pack discharges, multiple right ECS pack discharges, multiple cabin air compressor intake and discharges, multiple LPGP supplies, or multiple HPGP supplies may utilize additional sensors, such that each subsystem has a dedicated sensor.

The one or more sensors may be configured to monitor, periodically in real-time, multiple air supply lines for the vehicle to collect values for the sensed parameters. A sensor may store and/or transmit sensor data that includes values for these sensed parameters. The sensors may additionally be configured, for example, to associate a value for a sensed parameter with a timestamp that identifies the time of measurement. Each sensor of the one or more sensors may also have a unique identifier, such as a name or identification number, such that the sensor data can be associated with the particular sensor that collected that sensor data. Thus, in addition to the values for the sensed parameters, the sensor data may also include timestamp data and an identification of the sensor that captured the parameter values.

The one or more sensors may transmit the sensor data to a processing device. The processing device may, for example, be on board the vehicle or be external to the vehicle. As will be explained in more detail below, the processing device may then process the sensor data and generate an output based on the sensor data. The output may include any or more of an indication of a type of maintenance that is recommended for the vehicle, an indication of a subsystem within the vehicle for which maintenance is recommended, an indication of a location within the vehicle for which maintenance is recommended, an identification of a sensor that is detecting contamination in the air supply, or an identification of the location of the sensor that is detecting contamination in the supply air. A system of this disclosure may be configured to generate and/or output a recommended maintenance item during vehicle travel. Additionally or alternatively, the system may be configured to generate and/or output the recommended maintenance item after the vehicle travel has finished, such as when an aircraft is on the ground, an automobile is in a garage, or a ship is at port.

An existing system may be configured to shut down part of a ventilation system, an engine, or another component in response to detecting contamination in the supply air for a vehicle. The existing system may take a corrective action such as powering off a compressor, closing one or more valves, and/or temporarily powering off an air supply system. The existing system may perform one or more of these corrective actions during the travel of the vehicle, which may impact the performance and operation of the vehicle. In addition, the shutdown may have negative impacts on the vehicle operator, crewmembers, and passengers. In some examples, the sensed contamination may be caused by a very low concentration of particles and/or an error in the sensor or processing circuitry. Thus, it may be desirable for a controller to be configured to refrain from shutting down parts of the system so that the supply air can be continually circulated and resupplied. Additionally or alternatively, the control logic may be configured to, based on feedback from cabin sensors, shut down the system for a period of time before reactivating the system when the air quality is acceptable for passengers and crewmembers. The control logic may be configured to ensure the flow of fresh air at or above a minimum threshold level.

As will also be explained in greater detail below, in some examples, the processing device may be configured to process the sensor data in view of context data. As one example, context data may include weather conditions when the sensor data was obtained. Thus, if a sensor in a bleed air system senses a parameter that may be indicative of contamination, then the processing device may use the weather data to determine if the air temperature at the time of takeoff for a flight during which the sensor data was obtained was such that a source of the contamination may be deicing fluid. As another example, context data may include a flight stage for when the sensor data was obtained. Thus, if a sensor in a bleed air system senses a parameter that may be indicative of contamination, then the processing device may use the flight stage data to determine if the vehicle was taxiing or at the gate when the sensor data was obtained to determine if exhaust from another vehicle is a possible source of the contamination.

This disclosure describes systems and techniques that may be used to detect bleed air contamination to provide an early warning that vehicle maintenance may be needed or desirable. Additionally or alternatively, this disclosure describes systems and techniques that may identify a particular source, such as an engine or APU, of the bleed air contamination, and thus provide a maintenance crew with guidance as to which subsystem within a vehicle may be the source of the contamination and in need of maintenance. Additionally or alternatively, this disclosure describes systems and techniques that may identify a particular cause, such as a pilot error or a mechanical failure, that led to the bleed air contamination, and thus provide a maintenance crew with guidance as to whether maintenance may be needed, and if so, what type of maintenance. Additionally or alternatively, this disclosure describes techniques and systems that may be able to determine a type of contaminant source, such as whether the source is an internal contaminant such engine oil or an external contaminant such as exhaust.

Figure 1:
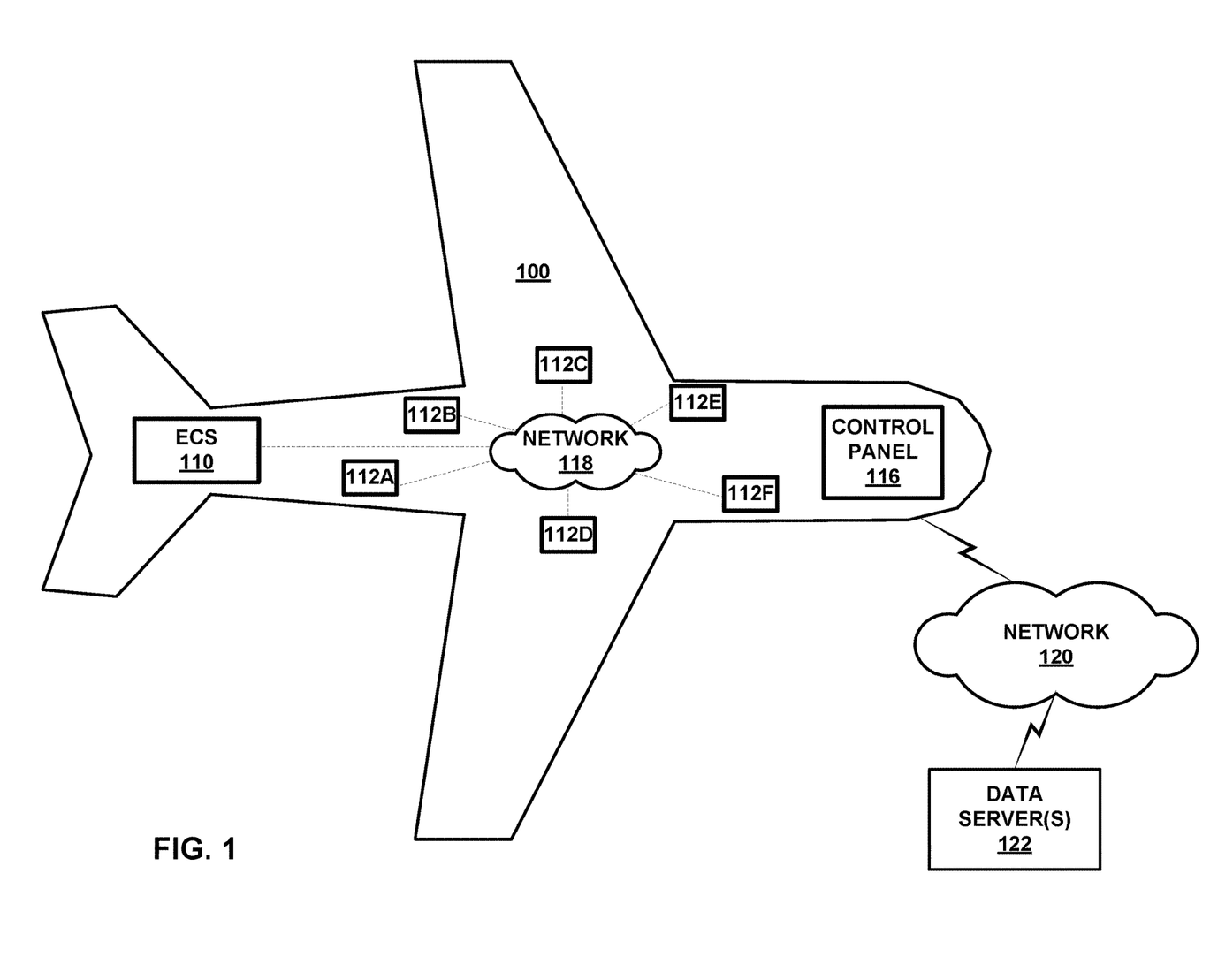
FIG. 1 is a conceptual block diagram depicting an example supply air contamination detection system, in accordance with aspects of this disclosure.

FIG. 1 is a conceptual block diagram of an example supply air contamination detection system in which vehicle 100 includes a plurality of sensors, shown in FIG. 1 as remote sensors 112A-112F (collectively remote sensors 112). Although FIG. 1 shows six remote sensors, vehicle 100 may include a smaller or larger number of remote sensors in other examples, such as two, three, four, five, or more than six sensors. Vehicle 100 also includes ECS 110 and control panel 116, which are configured to communicate with each other and with sensors 112 over network 118.

Although shown in FIG. 1 as having a fixed-wing form factor, vehicle 100 generally represents any sort of vehicle, and although the techniques of this disclosure may be used in conjunction with any sort of vehicle, the techniques described herein may be of particular benefit for passenger vehicles that include a cabin for passenger travel. Although various techniques of this disclosure will be described with respect to a passenger cabin of an airplane, it should be understood that the techniques are equally applicable to other compartments of other vehicles.

Remote sensors 112 may be located in any one or more of a location downstream of an engine, a location downstream of an APU, a location downstream of an ECS, such as ECS 110, a location downstream of an LPGP, a location downstream of an HPGP, a location in a bleed duct, or any other such location. In some examples, remote sensors 112 may all be the same type of sensor. That is, all of remote sensors 112 may be configured to sense the same parameter, or even be the same model of sensor. In other examples, remote sensors 112 may not all be the same type, and remote sensor 112A may, for instance, be configured to sense a different parameter than remote sensor 112B. In some implementations, one or more of sensors 112 may be modified to optimize the sensors for specific mounting locations to account for extreme cold, extreme heat, the presence of moisture, different composition of contaminants, or other such considerations.

ECS 110 may, for example, be configured to control the general comfort and safety in the passenger cabin of vehicle 100 by, for instance, circulating conditioned air to the passenger cabin, as well as to various other portions of vehicle 100, such as the flight deck, galleys, other occupied compartments, cargo compartments, electronic equipment bays, and the like. ECS 110 may perform such operations to provide a certain level of air quality in the cabin by, for example, maintaining desired temperatures and humidity levels within the cabin of vehicle 100. Additional example details of environmental control systems are described in commonly assigned U.S. patent application Ser. No. 16/921,445, entitled "Cabin Air Sensor for Ozone Detection," filed on Jul. 6, 2020, the entire contents of which are incorporated herein by reference.

Control panel 116 represents any sort of centralized data processing device configured to receive and process values sensor date detected by remote sensors 112. Control panel 116 can be a specialized electronic device, such as an application running on a computing device, such as a tablet, or can be integrated into an existing vehicle system, such as a vehicle cabin control system that controls the temperature, lighting, entertainment systems, and other aspects of passenger experience.

Network 118 represents any suitable wired or wireless communications network by which control panel 116 can communicate with remote sensors 112. As examples of wired communications, control panel 116 may communicate with remote sensors 112 over direct wiring, twisted pair, fiber optic cable, coaxial cable, or the like. As examples of wireless communications standards, control panel 116 may communicated with remote sensors 112 using an IEEE 802.11 specification (e.g., WiFi™), an IEEE 802.15 specification (e.g., ZigBee™), a Bluetooth™ standard, or the like. In some instances, network 118 may also include any number of intermediary devices such as routers or switches.

In some examples, ECS 110 may also interface with control panel 116 via a controller of ECS 110. The controller of ECS 110 may, for example, be a computer having processing circuitry and a memory, configured to control an air purification subsystem and other subsystems of ECS 110. In some implementations, the controller of ECS 110 and control panel 116 may be highly integrated or even implemented in the same device.

According to techniques of this disclosure, control panel 116 may be configured to receive sensor data from sensors 112 and process the sensor data to generate an output based on the sensor data. Control panel 116 may determine that a sensed parameter value for a sensor of sensors 112 is indicative of supply air contamination by, for example, comparing the sensed parameter to a threshold value and/or detecting a change (e.g., an absolute increase or decrease or a percentage increase or decrease) in the parameter level (e.g., VOC level) relative to a predetermined baseline, which can indicate contamination of the air supply or an emerging contamination.

For example, control panel 116 may determine a sensed parameter value for a sensor of sensors 112 is indicative of supply air contamination by at least determining that the sensed parameter is greater than or equal to an upper threshold value for the sensed parameter or less than or equal to a lower threshold value for the sensed parameter. The thresholds can be predetermined and stored in a memory of any suitable device. In response to determining that the sensed parameter value for the sensor is indicative of supply air contamination, control panel 116 may determine a location associated with the specific sensor of sensors 112 that detected the sensed parameter value indicative of supply air contamination. Control panel 116 may then output, based on the location of the specific sensor, an indication of a specific subsystem or location within vehicle 100 that may be in need of maintenance.

Control panel 116 may also utilize context data when analyzing the sensor data and, based on the context data, determine a likely location or subsystem within the vehicle from which the contamination is emanating. Control panel 116 may additionally or alternatively utilize the context data to determine a likely source for the contamination. For example, control panel 116 may receive context data indicating that vehicle 100 is parked on the ground without the engines running. Based on this context data and based on determining that an APU is running while engines are not running, control panel 116 may be configured to recommend that the APU be inspected.

Control panel 116 may be configured to store, during flight and/or during ground operations, the values for the one or more sensed parameters for the supply air for the vehicle cabin and transmit, either during flight or post flight via network 120, the values for the one or more sensed parameters to data servers 122. Data servers 122, which can include any suitable processing circuitry in some examples, may then process the sensed parameters data obtained from vehicle 100. For example, based on a comparison of the sensed parameters data obtained from vehicle 100 with aggregated sensed parameters data from other vehicles, data servers 122 may analyze the health of vehicle 100 to determine if there is supply air contamination within vehicle 100 that is indicative of a subsystem needing maintenance. If data servers 122, for example, determines that a level of a contaminant detected by a sensor that is downstream from ECS 110 is higher than that detected by other similarly situated sensors for other similarly situated flights, then data servers 122 may output a maintenance recommendation that ECS 110 be inspected.

Network 120 represents any suitable communication links between control panel 116 and data servers 122, including wireless communication links according to a cellular communication standard, such as 4G, 4G-LTE (Long-Term Evolution), LTE Advanced, 5G, or the like, or an IEEE 802.11 specification, an IEEE 802.15 specification (e.g., ZigBee™), a Bluetooth™ standard, or the like. Network 120 may also include any number of wired communication links and include intermediary devices such as routers and switches.

Although various techniques for processing the sensor data of sensors 112 have been described herein as being performed by control panel 116, it should be understood that in some alternate implementations, those techniques may be performed entirely or partially by an external processing device such as data servers 122. Control panel 116 may, for example, collect sensor data from sensors 112 and periodically, either during flight or post flight, transmit the collected sensor data, via network 120, to data servers 122.

In one example use case of the techniques described above, during a deicing procedure, deicing fluid may deposit on entries to a bleed air system. The deposits can heat up and vaporize or burn, which can create a range of compounds in the bleed air, which are not normally present. These compounds may enter the cabin and be inhaled by passengers and crew, but these compounds may not cause a perception of odor. One or more of sensors 112 may be configured to detect TVOC levels or concentrations of key marker compounds, such as glycols, aldehydes, or carboxylic acids, that are indicative of contamination.

In response to receiving this sensor data from sensors 112, control panel 116 or data servers 122 may determine context data for the sensor data to determine a possible source of the contaminant. If, for example, the context data indicates that the wheels of vehicle 100 were on the ground, a speed of vehicle 100 was zero km/h, and the air temperature outside was suitably low such that deicing fluid was used, then control panel 116 or data servers 122 may determine that deicing fluid was the source of the contamination. Additionally, control panel 116 or data servers 122 may determine if, at the time the sensor data was obtained, certain bleed valves were open or closed, whether an air recirculation system is one on or off, whether an APU was on or off, and other such context information. Based on this additional context data, control panel 116 or data servers 122 may be configured to determine, for example, whether the contamination entered the supply air due to a mechanical failure, maintenance crew error, or pilot error.

In another example use case of the techniques described above, engine oil may leak from a main engine or APU and enter bleed air. The engine oil may heat up and vaporize or burn, creating a range of compounds in bleed air that are not normally present or are only present in very low quantities. The vapor or fumes of burning oil is often reported as being associated with and undesirable odor that may worry passengers. One or more of the sensors 112 may be configured to sense indicators of contamination, such as elevated concentrations of key marker compounds like aldehydes, synthetic fatty acetic, aromatics, and the like. In response to receiving this sensor data from sensors 112, control panel 116 or data servers 122 may determine context data for the sensor data to determine a possible source of the contaminant.

Control panel 116 or data servers 122 may be configured to determine if the sensor data was obtained while vehicle 100 was at a top of a climb, a top of a descent, or dry cranking with wheels on the ground, or recently after oil maintenance has been performed, some or all of which may be examples of context data and/or an operational status of vehicle 100. Based on this context data, control panel 116 or data servers 122 may, for example, generate a recommendation to a user (e.g., a maintenance crewmember) to check if there has been recent oil tank over-servicing, if bearing or seals are beginning to fail, if a drain passage is blocked, if a nacelle is improperly vented, if a gearbox is leaking, if an oil filter is leak, if turbine starter is leaking, if an oil transmitter is leaking, if an oil breather vent is failing, of if an external leak is present. This list of recommended maintenance checks may include fewer maintenance checks than a maintenance crew would otherwise need to make, and thus may save a vehicle operator time and money. The generation of a recommended maintenance item by control panel 116 to inspect for one of the issues listed above may be based on additional context data, such as an operational status of an engine, motor, or APU on vehicle 100.

Figure 2:
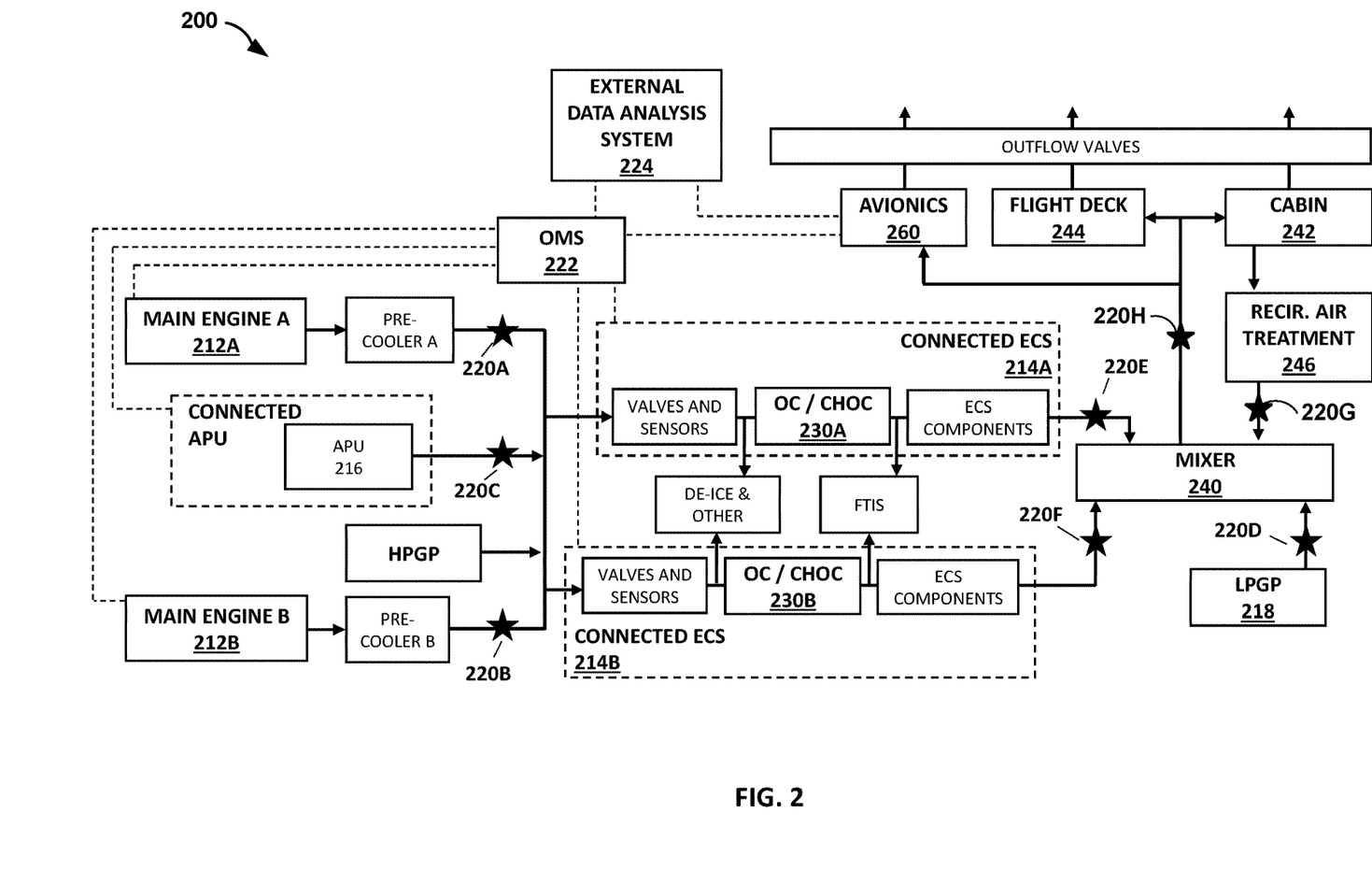
FIG. 2 is a conceptual diagram depicting an example system architecture for a supply air contamination detection system, in accordance with aspects of this disclosure.

FIG. 2 is a conceptual diagram depicting an example system architecture for a supply air contamination detection system within vehicle 200. Vehicle 200 includes multiple subsystems, including main engines 212A and 212B, ECS 214A and 214B, APU 216, LPGP 218, and several other subsystems. In the example of FIG. 2, the stars represent example locations for sensors 220A-220F. Locations 220A and 220B represent examples of locations downstream of an engine. Specifically, location 220A is located after a pre-cooler and downstream of a left engine of a main engines 212A and 212B, and location 220B is located after a pre-cooler and downstream of a right engine of a main engines 212A and 212B. Location 220C represents an example of a location downstream of an APU. Location 220C is upstream of the intersection of the line from APU 216 and the line from main engines 212A and 212B. Location 220D represents an example of a location downstream of an LPGP. Locations 220E and 220F (e.g., left pack and right pack) represent examples of locations that are downstream of an ECS. Specifically, location 220E is downstream of ECS 214A (e.g., a left pack), and location 220F is downstream of ECS 214B (e.g., a right pack).

Vehicle 200 also includes on-board maintenance system (OMS) 222, which may generally perform similar functionality to control panel 116, discussed above with respect to FIG. 1. OMS 222 may be configured to transmit sensor data collected by the sensors to external data analysis system 224, which may generally perform similar functionality to data servers 122, discussed above with respect to FIG. 1. External data analysis data 224 may be located outside of the vehicle, and OMS 222 may be configured to communicate with external data analysis system 224.

OMS 222 and/or external data analysis system 224 may be configured to receive data from sensors positioned at any of locations 220A-220F. For example, maintenance crew on the ground may be able to read data on a diagnostic device that wirelessly receives data from the sensors. OMS 222 and/or external data analysis system 224 may be configured to also receive context data from engines 212A and 212B, ECS 214A and 214B, APU 216, and/or avionics 260. OMS 222 and/or external data analysis system 224 may be configured to generate a recommended maintenance item based on the sensor data and the context data. For example, OMS 222 and/or external data analysis system 224 may be configured to generate a recommendation that an oil tank or an oil breather on the vehicle be inspected, that a bearing on the vehicle or a seal on the vehicle be inspected, that a drain passage on the vehicle be inspected for a blockage, that a nacelle on the vehicle be inspected for proper ventilation, or that a gearbox on the vehicle, an oil filter on the vehicle, a turbine starter on the vehicle, or an oil transmitter on the vehicle be inspected for a leak. OMS 222 and/or external data analysis system 224 may be configured to generate a recommendation to perform a specific action with respect to any of the components listed above (e.g., oil tank, oil breather, etc.).

ECS 214A and 214B includes valves and sensors, anti-ice system, fuel tank inerting system (FTIS), ECS components, and ozone converter/combined hydrocarbon and ozone converter (CHOC) 230A and 230B. CHOC 230A and 230B may be referred to as a bleed catalytic converter. As an alternative to CHOC 230A and 230B, vehicle 200 may include a single-purpose ozone converter (OC) for removing ozone by converting ozone molecules to dioxygen molecules. Note, that some aircraft may not be equipped with CHOC or OC. Additional example details of ozone converters are described in commonly assigned U.S. patent application Ser. No. 17/171,896, entitled "High Efficiency Combined Hydrocarbon and Ozone Converter," filed on Feb. 9, 2021, the entire contents of which are incorporated herein by reference.

Mixer 240 may be configured to receive recirculated air from cabin 242 and receive supply air from ECS 214A and 214B and/or LPGP 218. Mixer 240 can mix the air from these two sources and deliver the air to flight deck 244 and cabin 242. One or more sensors may be positioned upstream or downstream from mixer 240. For example, a first sensor may be positioned downstream of ECS 214A and 214B and upstream of mixer 240 (e.g., locations 220E or 220F), a second sensor may be positioned downstream of LPGP 218 and upstream of mixer 240 (e.g., location 220D), a third sensor may be positioned downstream of recirculation air treatment 246 and upstream of mixer 240 (e.g., location 220G), and a fourth sensor may be positioned downstream of mixer 240 (e.g., location 220H). Additional sensor(s) may be positioned in the cabin and/or cockpit of the vehicle.

Figure 3:
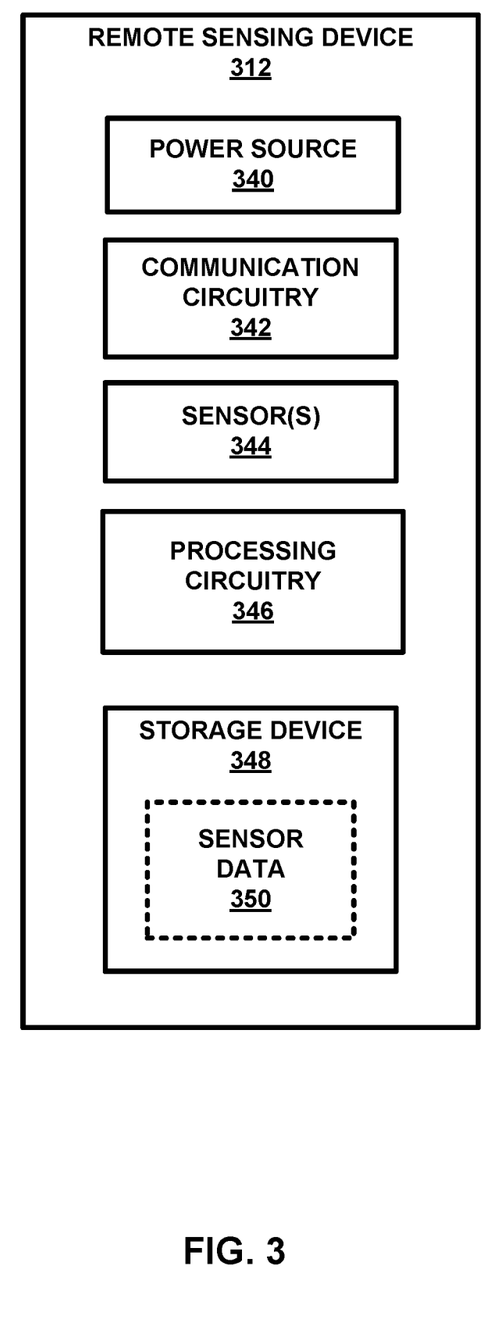
FIG. 3 is a conceptual block diagram of an example remote sensing device.

FIG. 3 is a conceptual block diagram of an example remote sensing device. In the example of FIG. 3, remote sensing device 312 includes power source 340, communication circuitry 342, sensors 344, processing circuitry 346, and storage device 348. Remote sensing device 312 is an example implementation of any of remote sensors 112 described above with respect to FIG. 1. Remote sensing device 312 may be positioned anywhere in a vehicle, including at a location downstream of an engine, a location downstream of an APU (e.g., upstream of the intersection of the APU line and the engine line), a location downstream of an environmental control system, a location downstream of an LPGP, a location downstream of an HPGP, or a location in a bleed duct.

Power source 340 represents all sources of power for the various components of remote sensing device 312 and may include one or more batteries, one or more capacitors, circuitry for receiving alternating current (e.g., 115 volts of 230 volts), or circuitry for receiving direct current (e.g., 28 volts).

Communication circuitry 342 generally represents any one or more of wireless transmitters, wireless receivers, modems, wired networking components (e.g., Ethernet cards), wireless communication components that operate according to any of a variety of IEEE 802.11 standards, or other physical components for facilitating the communication over network 118 described above with respect to FIG. 1.

Sensors 344 generally represent the sensing capabilities of remote sensing device 312 and are configured to sense one or more air quality parameters. For example, sensors 344 may include one or more of a TVOC sensor or other sensors configured to sense compounds such as aldehydes, carboxylic acids, synthetic fatty acetic, aromatics, glycols, particles and/or ultrafine particles, or any other such compounds. Sensors 344 include any suitable sensing circuitry configured to sense the parameter of interest. For example, sensors 344 may include any one or more of nondispersive infrared sensors, chemical-based sensors, electromechanical sensors, catalytic bead sensors, photoionization sensors, infrared point sensors, infrared imaging sensors, semiconductor-based sensors, ultrasonic sensors, frequency resonance, or holographic sensors. In some examples, sensors 344 may include one or more biosensors, including electrochemical biosensors, optical biosensors, electronic biosensors, piezoelectric biosensors, gravimetric biosensors, or pyroelectric biosensors.

Processing circuitry 346 generally represents any of the circuitry of remote sensing device 312 needed to carry out any of the functionality described herein, and may include one or more microprocessors, digital signal processors (DSPs), application specific integrated circuits (ASICs), field programmable gate arrays (FPGAs), discrete logic, software, hardware, firmware, or any combinations thereof.

Storage device 348 represents any one or more of read only memory (ROM) or random access memory (RAM), including dynamic random access memory (DRAM), including synchronous DRAM (SDRAM), magnetoresistive RAM (MRAM), resistive RAM (RRAM). Storage device 348 may alternatively or additionally include optical disk storage, magnetic disk storage, or other magnetic storage devices, flash memory, or any other medium that can be used to store desired program code in the form of instructions or data structures and that can be accessed by a computer, such as control panel 116.

Storage device 348 may be configured to store sensor data 350, which represents the sense parameter values obtained by sensors 344. In this regards, storage device 348 may represent a short term, temporary storage, such as a buffer that stores the sensed parameter values prior to transmission by communication circuitry 342, or may represent a longer term, non-volatile storage that that stores the sensed parameter values indefinitely for future processing.

Figure 4:
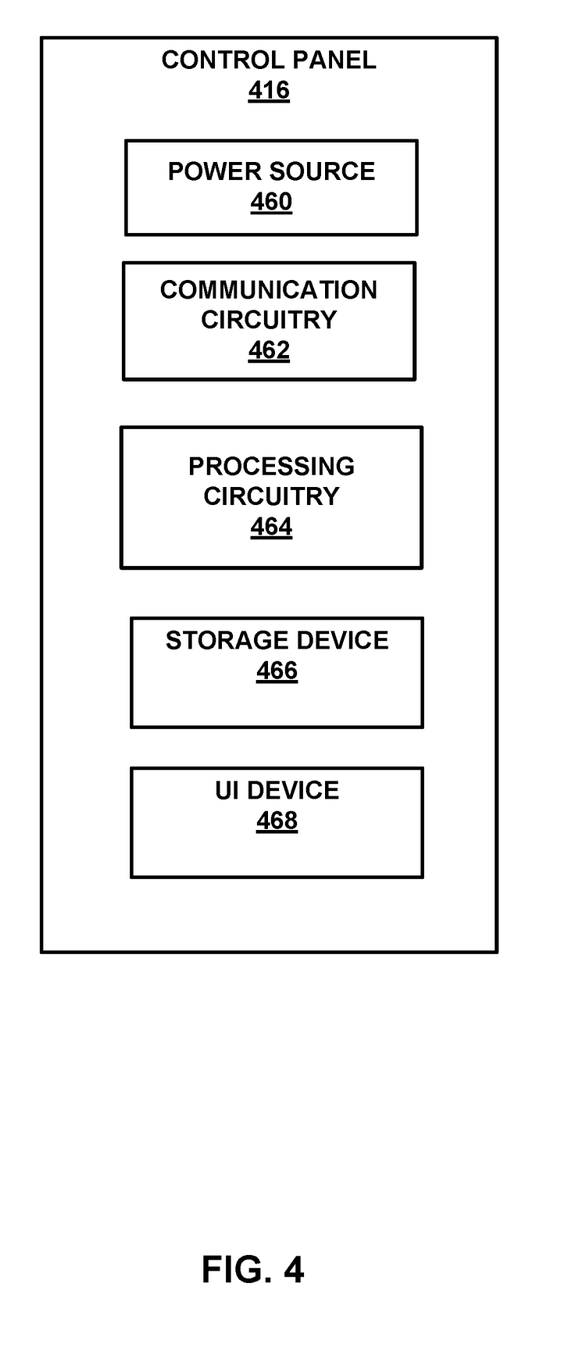
FIG. 4 is a conceptual block diagram of an example control panel device.

FIG. 4 is a conceptual block diagram of an example control panel device. In the example of FIG. 4, control panel 416 includes power source 460, communication circuitry 462, processing circuitry 464, storage devices 466, and user interface (UI) device 468. Control panel 416 is an example implementation of control panel 116 described above with respect to FIG. 1.

Power source 460 represents all sources of power for the various components of control panel 416 and may include one or more batteries, one or more capacitors, circuitry for receiving alternating current (e.g., 115 volts of 230 volts), or circuitry for receiving direct current (e.g., 28 volts).

Communication circuitry 462 generally represents any one or more of wireless transmitters, wireless receivers, modems, wired networking components (e.g., Ethernet cards), wireless communication components that operate according to any of a variety of IEEE 802.11 standards, or other physical components for facilitating the communication over network 118 described above with respect to FIG. 1. Communication circuitry 462 may also include components for communicating via a cellular communication standard, such as 4G, 4G-LTE (Long-Term Evolution), LTE Advanced, 5G, or the like. Via communication circuitry 462, control panel 416 may communicate with other systems and components onboard a vehicle as well as with systems external to the vehicle, such as airport based systems or other ground-based systems. Communication circuitry 462 may also include components for communicating, during flight, with other vehicle- or ground-based systems.

Processing circuitry 464 generally represents any of the circuitry of control panel 416 needed to carry out any of the functionality described herein, and may include one or more microprocessors, DSPs, ASICs, FPGAs, discrete logic, software, hardware, firmware, or any combinations thereof.

Storage device 466 represents any one or more of ROM or RAM, such as DRAM, including SDRAM, MRAM, RRAM. Storage device 466 may alternatively or additionally include optical disk storage, magnetic disk storage, or other magnetic storage devices, flash memory, or any other medium that can be used to store desired program code in the form of instructions or data structures.

UI device 468 may be any one or more of a display, indicator lights, sound generating circuitry (e.g., a speaker), or any other such device for conveying information to a user of control panel 416. UI device 468 may, for example, be configured to output a visual warning indicator or an audible warning indicator in response to control panel 416 detecting an a supply air contamination event. UI device may also include user input components such as a keyboard, mouse, touchscreen display or the like. Although shown as part of control panel 416 in FIG. 4, UI device 468 may be physically seperate from, but in communication with, the other components of control panel 416.

Figure 5:
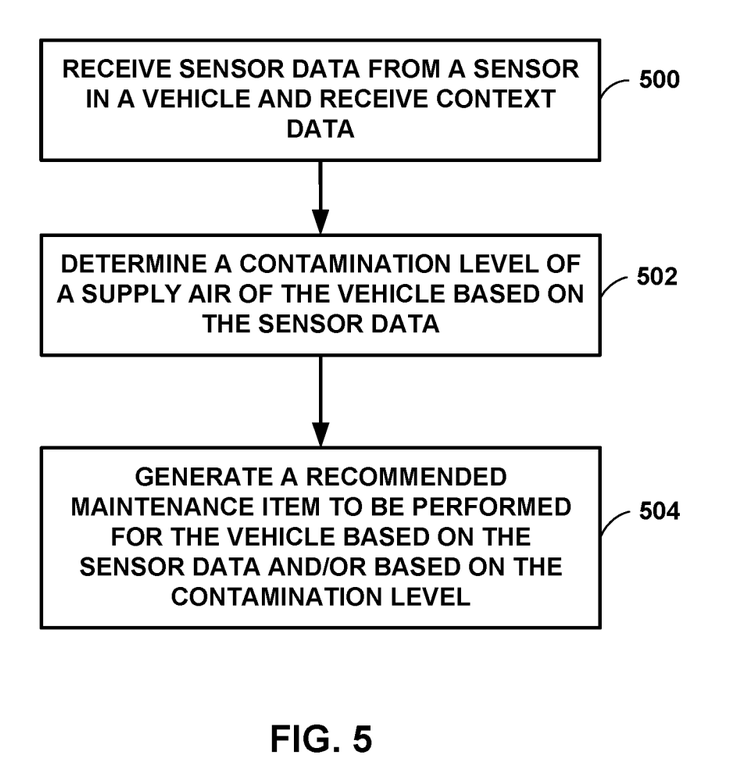
FIG. 5 is a flowchart illustrating example process for generating a recommended maintenance item, in accordance with some examples of this disclosure.

FIG. 5 is a flowchart illustrating example process for generating a recommended maintenance item, in accordance with some examples of this disclosure. The example process of FIG. 5 is described with reference to control panel 116 shown in FIG. 1, although other components may exemplify similar techniques. For example, data servers 122 or OMS 222 shown in FIGS. 1 and 2 may be configured to carry out the example process of FIG. 5, as well as any other steps described herein as being performed by control panel 116 or 416.

In the example of FIG. 5, control panel 116 receives sensor data from one or more of sensors 112A-112F (500). Control panel 116 may receive the sensor data from sensors 112 via network 118. Control panel 116 receive the sensor data as a series of measurements (e.g., sensed parameter values) taken by sensors 112. The sensor data may include a timestamp representing the time at which the sensor data was acquired. Additionally or alternatively, the sensor data may include a potential source location or source component of the contamination. Control panel 116 also receives context data from another system such as an avionics system, and engine, an APU, an ECS, and/or any other system in vehicle 100. The context data may indicate the current or past status of vehicle 100, an engine or motor on vehicle 100, or an APU on vehicle 100.

In the example of FIG. 5, control panel 116 determines a contamination level of a supply air of vehicle 100 (502). Control panel 116 may be configured to determine a respective contamination level based on data received from each of sensors 112A-112F. For example, control panel 116 can determine a first contamination level for a first location based on data received from sensor 112A, a second contamination level for a second location based on data received from sensor 112B, and so on.

Additionally or alternatively, control panel 116 may be configured to determine the source of the contamination based on the data received from each of sensors 112A-112F. For example, control panel 116 can use the contamination levels at each sensor location to determine the likely source location and/or source type of the contamination. Control panel 116 may be configured to determine whether the contamination source is internal to the vehicle, external to the vehicle, and whether the source type is exhaust, deicing fluid, or oil.

Control panel 116 may be configured to determine that a contamination level does not satisfy a threshold level by determining that a contamination level is greater than or equal to instantaneous threshold level (e.g., 250 ppb), determining that an average contamination level over a time duration is greater than or equal to a threshold level (e.g., 100 ppb), determining that a contamination level is outside of an acceptable range, and/or determining that a contamination level exceeds a baseline level by more than a threshold amount.

Control panel 116 may be configured to determine whether and to what extent the contamination level exceeds a baseline level. The baseline level may be an indication of the historical level of contamination at a location on the vehicle (e.g., in a specific duct) and/or a geographic location (e.g., latitude and longitude). Control panel 116 may be configured to determine the baseline level based on past measurements from the respective one of sensors 112A-112F. Additionally or alternatively, the baseline level may be a predetermined value that is set during manufacture or a software update, where the predetermined value is based on a fleet-wide or industry-wide acceptable level. The use of a baseline level may allow for the detection of an increase in contamination, even where the sensed contamination level remains below any other threshold level.

In the example of FIG. 5, control panel 116 generates a recommended maintenance item to be performed for vehicle 100 based on the sensor data and/or based on the contamination level (504). Control panel 116 may be configured to select a subset of one or more maintenance items from a set of possible maintenance items. The recommended maintenance item may include a recommendation to inspect a component of ECS 110 or another component on vehicle 100. For example, control panel 116 may be configured to generate a recommendation to inspect an oil tank, bearing, seal, oil breather, drain passage, nacelle, gearbox, oil filter, turbine starter, and/or oil transmitter on vehicle 100. In some examples, the recommended maintenance item may include a rating of the urgency and/or importance of performing the maintenance item. Control panel 116 may be configured to generate an item that recommends no maintenance action but informs the user of an issue that has been identified.

Control panel 116 may be configured to generate a recommended maintenance item based on the location at which contamination was detected. For example, in response to detecting maintenance downstream of an APU and upstream of the engine lines, control panel 116 may be configured to generate a recommendation that the APU be inspected. Thus, control panel 116 may provide information to a technician or other user about how to address the source of any contamination.

Control panel 116 may be configured to present the recommended maintenance item to a user via a display in vehicle 100 and/or via a display external to vehicle 100. The display on vehicle 100 may be part of the avionics system (e.g., where vehicle 100 is an aircraft). Additionally or alternatively, control panel 116 may be configured to transmit an indication of the recommended maintenance item to network 120 and/or data servers 122.

Additionally or alternatively, control panel 116 may be configured to output information about the sensed parameters, such as a contamination level associated with a location in vehicle 100. Control panel 116 may be configured to output other information such as a timestamp and/or context information associated with the contamination level. Control panel 116 may be configured to output the recommended maintenance item including a rating of the urgency and/or importance associated with the item, as well as a timeline, deadline, or date associated with the item. Control panel 116 may be configured to generate a notice of an issue that does not include a corrective action.

Control panel 116 may be configured to also output a category or list of maintenance items for further inspection and/or a location to further inspect. For example, control panel 116 can output a portion of the system that should be inspected, along with a list of the components in that portion of the system. Control panel 116 can select, from a list of items, one or more maintenance items associated with the identified issue so that the technician can check each of the items. Each of these maintenance items may possibly fix the issue, but the technician should check each item to discover whether there are any problems or defects that require maintenance.

The following examples represent examples of devices, systems, and techniques described above. Although the examples provide specific combinations of features, it is contemplated that unless stated to the contrary, other combinations of features described in the examples are also within the scope of this disclosure.

Example 1: A vehicle system that includes a first sensor implemented in first circuitry, configured to be mounted at a first location within a vehicle, and configured to collect first sensor data for a first sensed parameter and transmit the first sensor data to a processing device; and a second sensor implemented in second circuitry, configured to be mounted at a second location within the vehicle, and configured to collect second sensor data for a second sensed parameter and transmit the second sensor data to the processing device.

Example 2: The vehicle system of example 1, further comprising one or more additional sensors implemented in additional circuitry, configured to be mounted at additional locations within the vehicle, and configured to collect additional sensor data for additional sensed parameters and transmit the additional sensor data to the processing device.

Example 3: The vehicle system of example 1 or 2, wherein one or both of the first sensed parameter and the second sensed parameter includes a measurements of a compound level.

Example 4: The vehicle system of example 3, wherein each of the measurements of compound levels has an associated time stamp.

Example 5: The vehicle system of any of examples 1-4, wherein one or both of the first sensor data and the second sensor data includes measurements of TVOC levels.

Example 6: The vehicle system of example 5, wherein each of the measurements of TVOC levels has an associated time stamp.

Example 7: The vehicle system of any of examples 1-6, wherein the first sensor data includes an identification of the first sensor or the first location; and/or the second sensor data includes an identification of the second sensor or the second location.

Example 8: The vehicle system of any of examples 1-7, wherein the first sensed parameter is the same as the second sensed parameter.

Example 9: The vehicle system of any of examples 1-8, wherein the first location and the second location are each one or more of a location downstream of an engine, a location downstream of an APU, a location downstream of an environmental control system, a location downstream of a low-pressure ground port, a location downstream of a high-pressure ground port, or a location in a bleed duct.

Example 10: The vehicle system of any of examples 1-9, wherein the processing device includes one or more of a system onboard the vehicle, a cloud-based system, a system external to the vehicle, or the first circuitry or the second circuitry.

The processing device described in examples 1-10 may correspond to the data processing system of Examples 11-29 or to any other such processing device described herein.

Example 11: A data processing system that includes communication circuitry configured to receive sensor data from one or more sensors mounted in a vehicle; and processing circuitry configured to process the sensor data and generate an output based on the sensor data.

Example 12: The data processing system of example 11, wherein each respective sensor of the one or more sensors is associated with a respective location within the vehicle, and wherein the processing circuitry is configured generate the output based on a location associated with one of the one or more sensors.

Example 13: The data processing system of example 11 or 12, wherein the one or more sensors include one or more of a sensor located downstream of an engine; a sensor located downstream of an APU; a sensor located downstream of an environmental control system; a sensor located downstream of a low-pressure ground port; or a sensor in a bleed duct.

Example 14: The data processing system of any of examples 11-13, wherein the processing circuitry is further configured to determine that a sensed parameter value for a sensor of the one or more sensors is indicative of supply air contamination.

Example 15: The data processing system of example 11, wherein to determine that the sensed parameter value for the sensor is indicative of supply air contamination, the processing circuitry is configured to determine that the sensed parameter is greater than or equal to an upper threshold value for the sensed parameter or less than or equal to a lower threshold value for the sensed parameter.

Example 16: The data processing system of example 14 or 15, wherein in response to determining that the sensed parameter value for the sensor is indicative of supply air contamination, the processing circuitry is further configured to generate the output.

Example 17: The data processing system of example 16, wherein the processing circuitry is further configured to generate the output in response to other sensors of the one or more sensors mounted in the vehicle determining that a sensed parameter value for the other sensors is not indicative of supply air contamination.

Example 18: The data processing system of example 16 or 17, wherein the output includes an indication of a location associated with the sensor.

Example 19: A data processing system that includes communication circuitry configured to receive first sensor data from a first sensor and second sensor data from a second sensor; and processing circuitry configured to: process the first sensor data; process the second sensor data; and generate an output based on one or both of the first sensor data and the second sensor data.

Example 20: The data processing system of example 19, wherein the first sensor is associated with a first location, and the second sensor is associated with a second location that is different than the first location.

Example 21: The data processing system of example 20, wherein the processing circuitry is further configured to generate the output based on one or both of the first location or the second location.

Example 22: The data processing system of any of examples 19-22, wherein the first location comprises one or more of a location downstream of an engine, a location downstream of an APU, a location downstream of an environmental control system, or a location downstream of a low-pressure ground port.

Example 23: A data processing system that includes communication circuitry configured to receive sensor data from a sensor; and processing circuitry configured to: determine a location of the sensor; and generate an output based on the sensor data and the location for the sensor.

Example 24: The data processing system of example 23, wherein the processing circuitry is further configured to determine context data associated with the sensor data; and generate the output based on the sensor data, the location for the sensor, and the context data.

Example 25: The data processing system of example 23 or 24, wherein the processing circuitry is further configured to determine a subsystem within the vehicle for which maintenance is recommended based on the location of the sensor.

Example 26: The data processing system of any of examples 23-25, wherein the processing circuitry is further configured to determine a location within the vehicle for which maintenance is recommended based on the location of the sensor.

Example 27: A data processing system that includes communication circuitry configured to receive sensor data from a sensor; and processing circuitry configured to: determine context data for the sensor data; and generate an output based on the sensor data and the context data for the sensor data.

Example 28: The data processing system of any of examples 23-27, wherein the context data includes one or more of a pressure in a vehicle when the sensor data was obtained; a pressure outside the vehicle when the sensor data was obtained; an altitude of the vehicle when the sensor data was obtained; a weight on one or more wheels of the vehicle when the sensor data was obtained; a location of the vehicle when the sensor data was obtained; a flight phase, such as on ground, taxing, takeoff, cruising, landing, or at gate, for the vehicle when the sensor data was obtained; weather conditions during a takeoff associated with a flight when the sensor data was obtained; an engine throttle setting; an equipment status for when the sensor data was obtained, such as whether an APU is on or off, whether a bleed valve is opened or closed, an ECS setting; data received by the vehicle during operation of the vehicle; data downloaded after completion of operation of the vehicle; or user input data.

Example 29: The data processing system of any of examples 11-28, wherein the output includes one or more of an indication of a type of maintenance that is recommended, an indication of a subsystem within the vehicle for which maintenance is recommended, an indication of a location within the vehicle for which maintenance is recommended, an identification of the sensor, an identification of the location of the sensor, a safety alert, a signal to activate one or more safety systems on the vehicle, a signal to activate a comfort system on the vehicle, or an indication of a most likely source of contamination.

Example 30: A method of processing sensor data includes receiving sensor data from one or more sensors mounted in air supply lines of a vehicle; processing the sensor data; and generating an output based on the sensor data.

Example 31: A method of processing sensor data includes receiving first sensor data from a first sensor located in a first air supply line of a vehicle; receiving second sensor data from a second sensor located in a second air supply line of the vehicle; processing the first sensor data; processing the second sensor data; and generating an output based on one or both of the first sensor data and the second sensor data.

Example 32: A method of processing sensor data includes receiving sensor data from a sensor located in air supply line of a vehicle; determining a location of the sensor; and generating an output based on the sensor data and the location for the sensor.

Example 33: A method of processing sensor data includes receiving sensor data from a sensor located in air supply line of a vehicle; determining context data for the sensor data; and generating an output based on the sensor data and the context data for the sensor data.

Example 34: The method of any of examples 30-33, wherein receiving the sensor data comprises receiving the sensor data from the vehicle during a flight of the vehicle.

Example 35: The method of any of examples 30-34, wherein receiving the sensor data comprises receiving the sensor data from the vehicle after a flight of the vehicle, wherein the sensor data was obtained during the flight of the vehicle.

Example 36: A data processing system configured to mount on a vehicle, the data processing system comprising: communication circuitry configured to: receive sensor data from a sensor on the vehicle, wherein the sensor data indicates a contamination level of a supply air for the vehicle; and receive context data from another system on the vehicle; and processing circuitry configured to generate a recommended maintenance item to be performed on the vehicle based on the sensor data and further based on the context data.

Example 37: The data processing system of example 36, wherein the sensor data includes a timestamp and a representation of a potential source of contamination.

Example 38: The data processing system of example 36 or 37, wherein the sensor data is first sensor data, wherein the sensor is a first sensor associated with a first location, wherein the communication circuitry is configured to receive second sensor data from a second sensor associated with a second location in the vehicle, wherein the second location that is different than the first location, and wherein the processing circuitry is configured to generate the recommended maintenance item based on the first sensor data and the second sensor data.

Example 39: The data processing system of any of examples 36-38, wherein the sensor is associated with a location on a first line out of an auxiliary power unit on the vehicle and upstream of an intersection between the first line and a second line out of an engine on the vehicle.

Example 40: The data processing system of any of examples 36-39, wherein the context data comprises data indicating an operational status of the vehicle.

Example 41: The data processing system of any of examples 36-40, wherein the context data comprises data indicating a status of an engine on the vehicle or a status of a motor on the vehicle.

Example 42: The data processing system of nay of examples 36-41, wherein the context data comprises weight-on-wheels data, engine speed data, a status of a bleed valve, a status of a skin valve, a status of another valve, a status of recirculation air, a deicing status, ambient weather and temperature data, or a status of an auxiliary power unit.

Example 43: The data processing system of any of examples 36-42, wherein the processing circuitry is configured to: compare the sensor data with baseline data; and generate the recommended maintenance item based on the comparison of the sensor data with the baseline data.

Example 44: The data processing system of any of examples 36-43, wherein to generate the recommended maintenance item, the processing circuitry is configured to recommend that an oil tank on the vehicle be inspected.

Example 45: The data processing system of any of examples 36-44, wherein to generate the recommended maintenance item, the processing circuitry is configured to recommend that a bearing on the vehicle, an oil breather on the vehicle, or a seal on the vehicle be inspected.

Example 46: The data processing system of any of examples 36-45, wherein to generate the recommended maintenance item, the processing circuitry is configured to recommend that a drain passage on the vehicle be inspected for a blockage.

Example 47: The data processing system of any of examples 36-46, wherein to generate the recommended maintenance item, the processing circuitry is configured to select the recommended maintenance item from a list of possible maintenance items.

Example 48: The data processing system of any of examples 36-47, wherein to generate the recommended maintenance item, the processing circuitry is configured to recommend that a gearbox on the vehicle, an oil filter on the vehicle, a turbine starter on the vehicle, or an oil transmitter on the vehicle be inspected for a leak.

Example 49: A method for detecting contamination on a vehicle, the method comprising: receiving sensor data from a sensor in the vehicle, wherein the sensor data indicates a contamination level of a supply air for the vehicle; receiving context data from another system on the vehicle; and generating a recommended maintenance item to be performed on the vehicle based on the sensor data and further based on the context data.

Example 50: The method of example 49, wherein the sensor data is first sensor data, and wherein the sensor is a first sensor associated with a first location, the method further comprising receiving second sensor data from a second sensor associated with a second location in the vehicle, wherein generating the recommended maintenance item based on the first sensor data and the second sensor data.

Example 51: The method of example 49 or 50, further comprising receiving context data from another system on the vehicle, wherein the context data comprises data indicating an operational status of the vehicle, data indicating a status of an engine on the vehicle, or data indicating a status of a motor on the vehicle, and wherein generating the recommended maintenance item is based on the sensor data and further based on the context data.

Example 52: The method of any of examples 49-51, further comprising: comparing the sensor data with baseline data; and generating the recommended maintenance item based on the comparison of the sensor data with the baseline data.

Example 53: The method of any of examples 49-52, wherein generating the recommended maintenance item comprises generating a recommendation that a gearbox on the vehicle, an oil filter on the vehicle, a turbine starter on the vehicle, or an oil transmitter on the vehicle be inspected for a leak.

Example 54: A computer-readable storage medium storing instructions that when executed by one or more processors causes the one or more processors to: determine a contamination level of a supply air for a vehicle based on sensor data received from a sensor in the vehicle; and generating a recommended maintenance item to be performed on the vehicle based on the contamination level and further based on context data received from another system on the vehicle.

Example 55: The device of example 54, wherein the instructions to generate the recommended maintenance item comprise instructions to generate the recommended maintenance item based on the sensor data and further based on data indicating an operational status of the vehicle, data indicating a status of an engine on the vehicle, or data indicating a status of a motor on the vehicle.

The various electronic devices described in this disclosure may be implemented as one or more ASICs, as a magnetic nonvolatile RAM or other types of memory, a mixed-signal integrated circuit, a central processing unit (CPU), an FPGA, a microcontroller, a programmable logic controller (PLC), a system on a chip (SoC), a subsection of any of the above, an interconnected or distributed combination of any of the above, or any other type of component or one or more components capable of performing the techniques described herein.

Functions executed by electronics associated with the devices systems described herein may be implemented, at least in part, by hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in electronics included systems described herein. The terms "processor," "processing device," or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, functionality ascribed to the devices and systems described herein may be embodied as instructions on a computer-readable medium such as random access memory (RAM), read-only memory (ROM), non-volatile random access memory (NVRAM), electrically erasable programmable read-only memory (EEPROM), FLASH memory, magnetic data storage media, optical data storage media, or the like. The instructions may be executed to support one or more aspects of the functionality described in this disclosure. The computer-readable medium may be non-transitory.

Various aspects of the disclosure have been described. These and other aspects are within the scope of the following claims.

What is claimed is:

1. A data processing system configured to mount on a vehicle, the data processing system comprising:
   communication circuitry configured to:
      receive sensor data from a sensor on the vehicle, wherein the sensor data indicates a contamination level of a supply air for the vehicle and includes a timestamp identifying a time at which the sensor data was obtained; and
      receive context data from another system on the vehicle, wherein the context data indicates a status of the another system during a period of time corresponding to the time at which the sensor data was obtained; and
   processing circuitry configured to generate a recommended maintenance item to be performed on the vehicle based on the sensor data and further based on the context data.

2. The data processing system of claim 1, wherein the sensor data includes a representation of a potential source of contamination.

3. The data processing system of claim 1,
   wherein the sensor data is first sensor data,
   wherein the sensor is a first sensor associated with a first location,
   wherein the communication circuitry is configured to receive second sensor data from a second sensor associated with a second location in the vehicle,
   wherein the second location that is different than the first location, and
   wherein the processing circuitry is configured to generate the recommended maintenance item based on the first sensor data and the second sensor data.

4. The data processing system of claim 1, wherein the sensor is associated with a location on a first line out of an auxiliary power unit on the vehicle and upstream of an intersection between the first line and a second line out of an engine on the vehicle.

5. The data processing system of claim 1, wherein the context data comprises data indicating an operational status of the vehicle.

6. The data processing system of claim 1, wherein the context data comprises data indicating a status of an engine on the vehicle or a status of a motor on the vehicle.

7. The data processing system of claim 1, wherein the context data comprises weight-on-wheels data, engine speed data, a status of a bleed valve, a status of a skin valve, a status of another valve, a status of recirculation air, a deicing status, ambient weather and temperature data, or a status of an auxiliary power unit.

8. The data processing system of claim 1, wherein the processing circuitry is configured to:
   compare the sensor data with baseline data; and
   generate the recommended maintenance item based on the comparison of the sensor data with the baseline data.

9. The data processing system of claim 1, wherein to generate the recommended maintenance item, the processing circuitry is configured to recommend that an oil tank on the vehicle be inspected.

10. The data processing system of claim 1, wherein to generate the recommended maintenance item, the processing circuitry is configured to recommend that a bearing on the vehicle, an oil breather on the vehicle, or a seal on the vehicle be inspected.

11. The data processing system of claim 1, wherein to generate the recommended maintenance item, the processing circuitry is configured to recommend that a drain passage on the vehicle be inspected for a blockage.

12. The data processing system of claim 1, wherein to generate the recommended maintenance item, the processing circuitry is configured to select the recommended maintenance item from a list of possible maintenance items.

13. The data processing system of claim 1, wherein to generate the recommended maintenance item, the processing circuitry is configured to recommend that a gearbox on the vehicle, an oil filter on the vehicle, a turbine starter on the vehicle, or an oil transmitter on the vehicle be inspected for a leak.

14. A method for detecting contamination on a vehicle, the method comprising:
- receiving sensor data from a sensor in the vehicle, wherein the sensor data indicates a contamination level of a supply air for the vehicle and includes a timestamp identifying a time at which the sensor data was obtained;
- receiving context data from another system on the vehicle, wherein the context data indicates a status of the another system during a period of time corresponding to the time at which the sensor data was obtained; and
- generating a recommended maintenance item to be performed on the vehicle based on the sensor data and further based on the context data.

15. The method of claim 14, wherein the sensor data is first sensor data, and wherein the sensor is a first sensor associated with a first location,
- the method further comprising receiving second sensor data from a second sensor associated with a second location in the vehicle,
- wherein generating the recommended maintenance item based on the first sensor data and the second sensor data.

16. The method of claim 14, further comprising receiving context data from another system on the vehicle,
- wherein the context data comprises data indicating an operational status of the vehicle, data indicating a status of an engine on the vehicle, or data indicating a status of a motor on the vehicle, and
- wherein generating the recommended maintenance item is based on the sensor data and further based on the context data.

17. The method of claim 14, further comprising:
- comparing the sensor data with baseline data; and
- generating the recommended maintenance item based on the comparison of the sensor data with the baseline data.

18. The method of claim 14, wherein generating the recommended maintenance item comprises generating a recommendation that a gearbox on the vehicle, an oil filter on the vehicle, a turbine starter on the vehicle, or an oil transmitter on the vehicle be inspected for a leak.

19. A non-transitory computer-readable storage medium storing instructions that when executed by one or more processors causes the one or more processors to:
- determine a contamination level of a supply air for a vehicle based on sensor data received from a sensor in the vehicle and includes a timestamp identifying a time at which the sensor data was obtained; and
- generating a recommended maintenance item to be performed on the vehicle based on the contamination level and further based on context data received from another system on the vehicle, wherein the context data indicates a status of the another system during a period of time corresponding to the time at which the sensor data was obtained.

20. The non-transitory computer-readable storage medium of claim 19, wherein the instructions to generate the recommended maintenance item comprise instructions to generate the recommended maintenance item based on the sensor data and further based on data indicating an operational status of the vehicle, data indicating a status of an engine on the vehicle, or data indicating a status of a motor on the vehicle.

* * * * *